No. 888,173. PATENTED MAY 19, 1908.
C. M. JUSTICE.
MITER, TRY, AND BEVEL SQUARE.
APPLICATION FILED SEPT. 19, 1907.
2 SHEETS—SHEET 2.
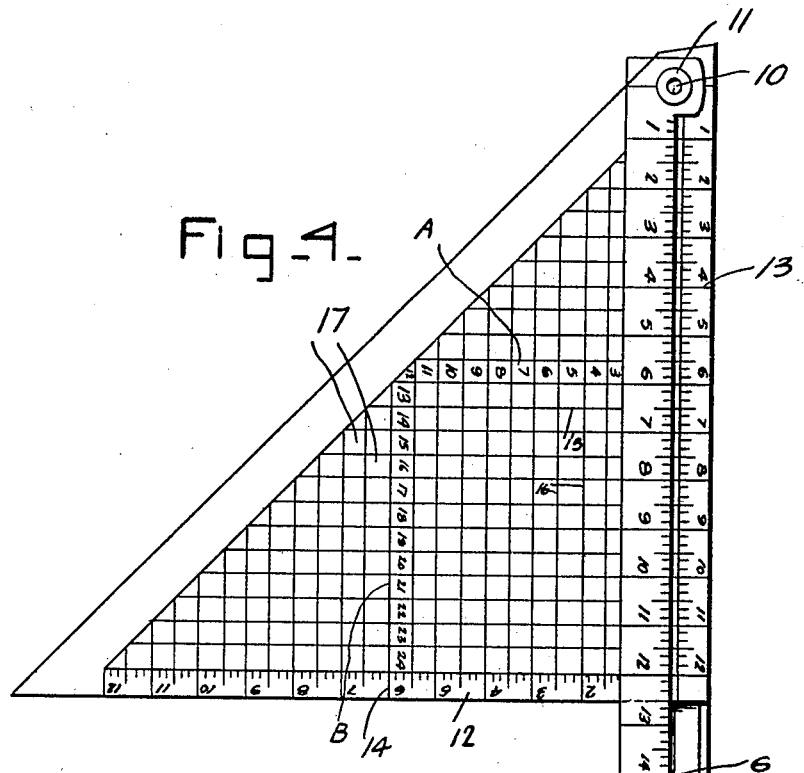
Fig. 4.
Fig. 3.
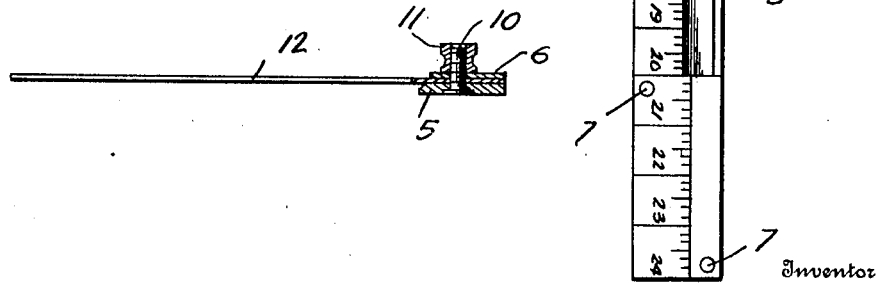
Witnesses
W. J. Rockwell
John Powers
Inventor
C. M. Justice
By Chandler & Chandler
Attorneys

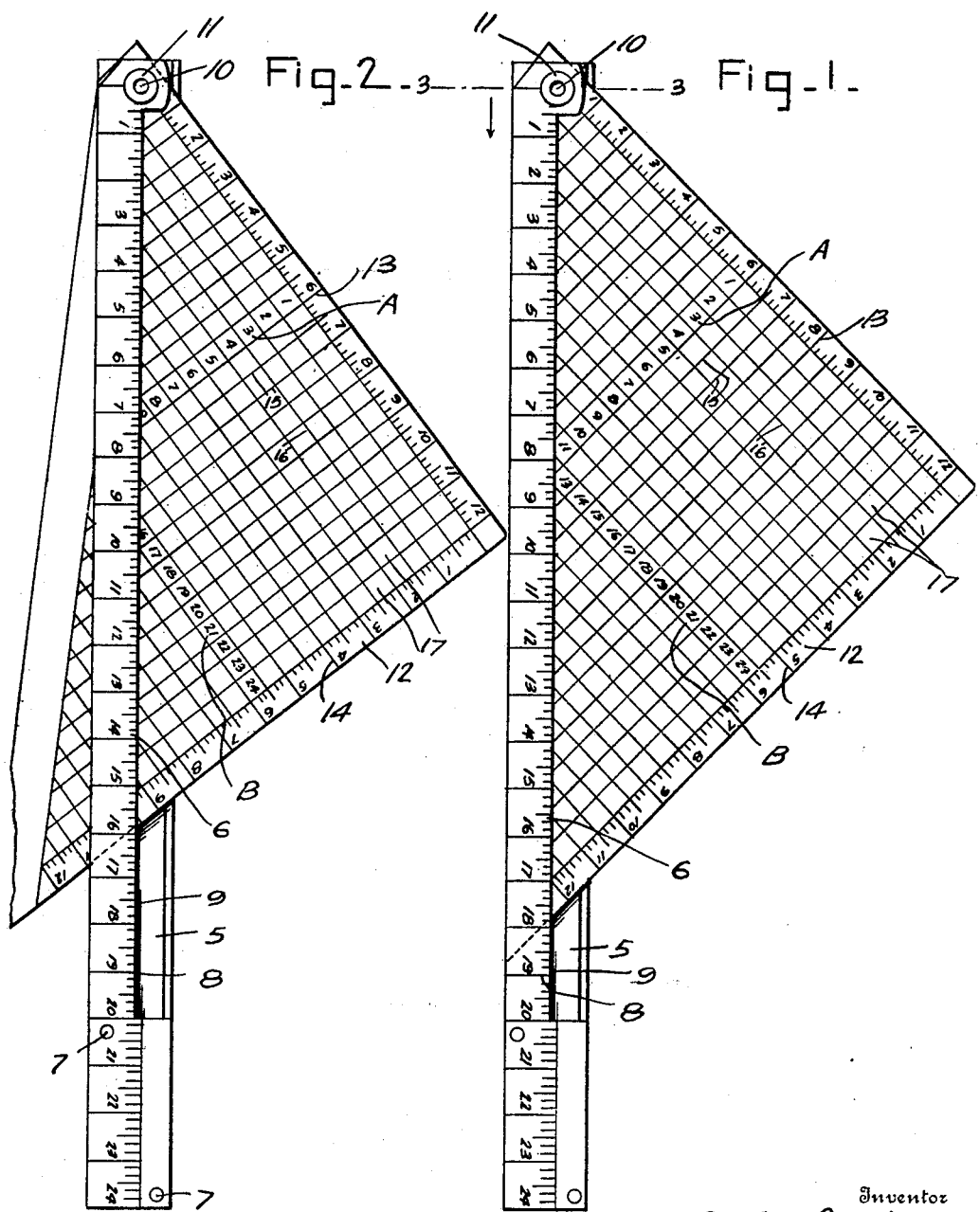

UNITED STATES PATENT OFFICE.

CLAIBORNE M. JUSTICE, OF AMO, INDIANA.

MITER, TRY, AND BEVEL SQUARE.

No. 888,173.  Specification of Letters Patent.  Patented May 19, 1908.

Application filed September 19, 1907. Serial No. 393,706.

*To all whom it may concern:*

Be it known that I, CLAIBORNE M. JUSTICE, a citizen of the United States, residing at Amo, in the county of Hendricks, State of Indiana, have invented certain new and useful Improvements in Miter, Try, and Bevel Squares; and I do hereby declare the following to be a full, clear, and exact description of the invention, such as will enable others skilled in the art to which it appertains to make and use the same.

This invention relates to squares such as are used by carpenters, the object of the invention being to provide an adjustable square which among other things may be used to correctly determine the lengths of rafters required when the pitch and width of the roof is known and which may be used for determining the bevels at both ends of the rafters.

Figure 1 is an elevation showing one position of the parts of a square constructed in accordance with the present invention. Fig. 2 is a similar view showing another position of the parts. Fig. 3 is a section on the line 3—3 of Fig. 1, and, Fig. 4 is an elevation showing the use of the tool as a square.

The device comprises a staff including a lower plate 5 and an upper plate 6, the upper plate 6 being reduced in width between its ends so as to expose a portion of the upper face of the plate 5. The plates are directly connected at one end by means of rivets 7 and at their opposite ends by means of a pivot 10 for a triangular member or plate 12 which is adapted to oscillate thereon between the plates 5 and 6. The blade or plate 12 is in the shape of substantially a right angle triangle and has marked thereon a true right angle triangle, the sides of which are parallel with the sides of the plate and the hypotenuse of which is parallel with the hypotenuse of the plate. At one side edge of the plate is marked a scale 13 extending the length of the corresponding side of the triangle marked on the plate, this scale to be divided into twelve major parts which are correspondingly numbered, the numbers progressing in a direction away from the pivot. Each major division is divided into minor divisions also, in the present instance six, though the number may be increased or diminished as desired. The plate is provided with a second scale 14 at the remaining side edge of the plate and corresponding to the adjacent side of the triangle marked upon the plate and extending from end to end of said side. This second scale is also divided into twelve major parts each of which is in turn divided into six parts in the present instance, although the parts may be greater or fewer as desired. The parts on both scales are, however, of the same length. The divisions of the scale 14 are numbered, the numbers progressing in a direction away from the scale 13, there being twelve major parts to each scale.

The plate 6 is likewise marked with a scale having major divisions and minor divisions, the major divisions being each of the same length as a major division of either of scales 13 and 14. The major divisions are numbered progressively, the progression extending away from the pivot 10, this last named scale being illustrated at 8.

Now the sides of the triangle marked on the plate being equal and the several scales being all equal, the square may be utilized as follows. The pivot 10 has its center at the apex of the triangle marked on the plate 12. Now the two sides of the triangle marked on the plate being equal, if the plate is swung until the scale mark 6 on the scale 12 is at the edge 9, then the angle between the edge 9 and the edge of the triangle having the scale 13, will be 22½ degrees or what is known as a one-quarter pitch. From the scale 12 are drawn lines parallel with the side of the triangle having scale 13 and from the scale 13 are drawn lines also parallel to the side having scale 12, these lines intersecting as illustrated. Supposing then it is desired to build a roof on a building twenty feet wide, and to give the roof a one-quarter pitch, the plate 12 is adjusted as just described to indicate a quarter pitch. The line leading from ten on scale 13 is then followed until it reaches the edge 9 of the plate 6 when the scale 8 on the plate 6 will at that point give the length of the top edge of the rafter to be cut while the angles between the plate 6 and the sides of the triangle will give the bevels at the ends of the rafter.

It will be noted that each side of the triangle is provided with a scale while the hypotenuse of the triangle has no scale. In this application distinction is to be made between side and hypotenuse, a side being either of the two boundaries that are at right angles to each other, while the remaining boundary is the hypotenuse.

What is claimed is:—

1. A device of the class described comprising a supporting member having a scale marked thereon, a second member pivoted to the first member with its pivot at the zero end of the scale, the second member having marked thereon a right-angled triangle having its apex at the axis of said pivot, the side of the triangle that extends from the pivot having a scale equal to the scale on the first member and marked "progressively" from the pivot, and the other side of the triangle having a scale equal to each of the other scales and marked progressively from the other side of the triangle, the two sides of the triangle being of the same length.

2. A device of the class described comprising a slotted supporting member having a scale marked thereon, a second substantially triangular member pivoted to the first member and disposed in the slot thereof, the second member having marked thereon a right-angled triangle having its apex at the axis of said pivot, the side of the triangle that extends from the pivot having a scale marked thereon equal to the scale of the first member and marked progressively from the pivot, and the other side of the triangle having a scale equal to each of the other scales and marked progressively from the other side of the triangle, the two sides of the triangle being of the same length.

In testimony whereof, I affix my signature, in presence of two witnesses.

CLAIBORNE M. JUSTICE.

Witnesses:
G. G. HUNTER,
O. S. CARTER.